BEST AVAILABLE COPY
W. W. HOPKINS.
CALCULATING MACHINE.
APPLICATION FILED JUNE 18, 1908.
1,069,953.
Patented Aug. 12, 1913.
10 SHEETS—SHEET 6.
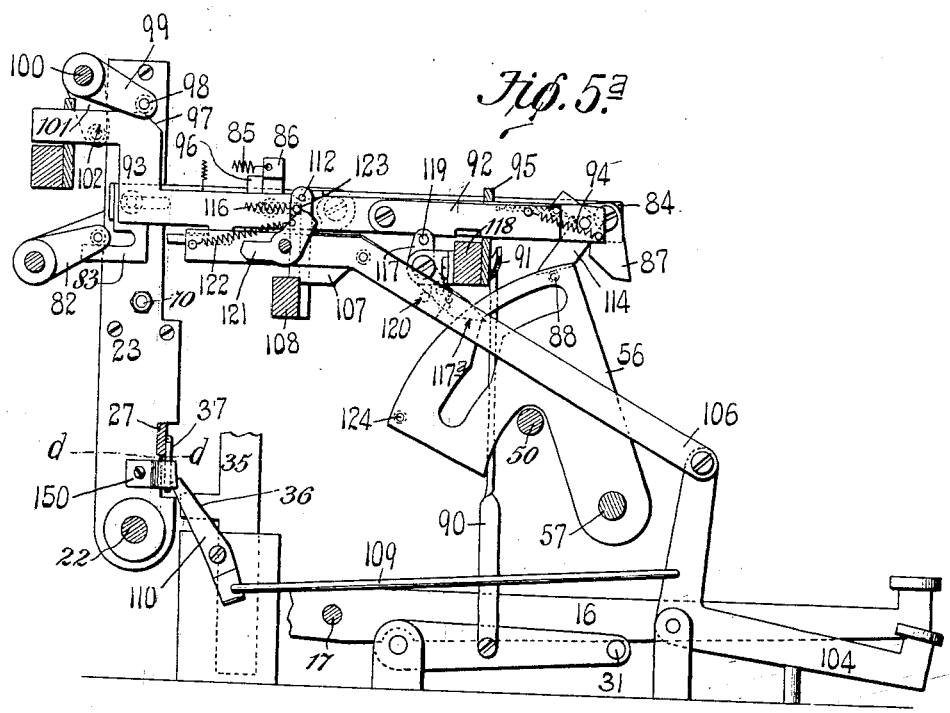
Witnesses
A. J. McCauley
Lenore Wilson
Inventor;
William W. Hopkins.
By Bakewell Cornwall Atty's W. W. HOPKINS.
CALCULATING MACHINE.
APPLICATION FILED JUNE 18, 1908.
1,069,953.
Patented Aug. 12, 1913.
10 SHEETS—SHEET 7.
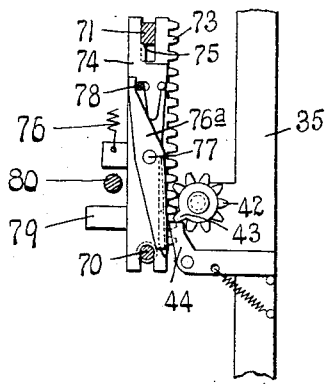
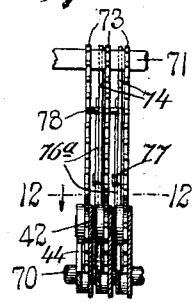
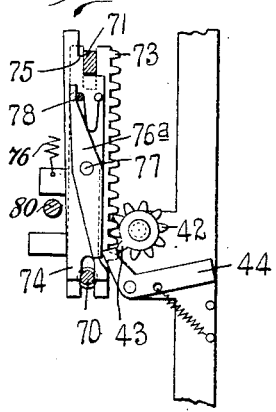
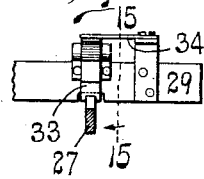
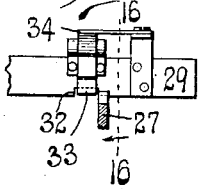
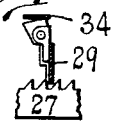
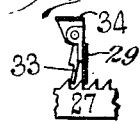
Inventor.
William W. Hopkins.

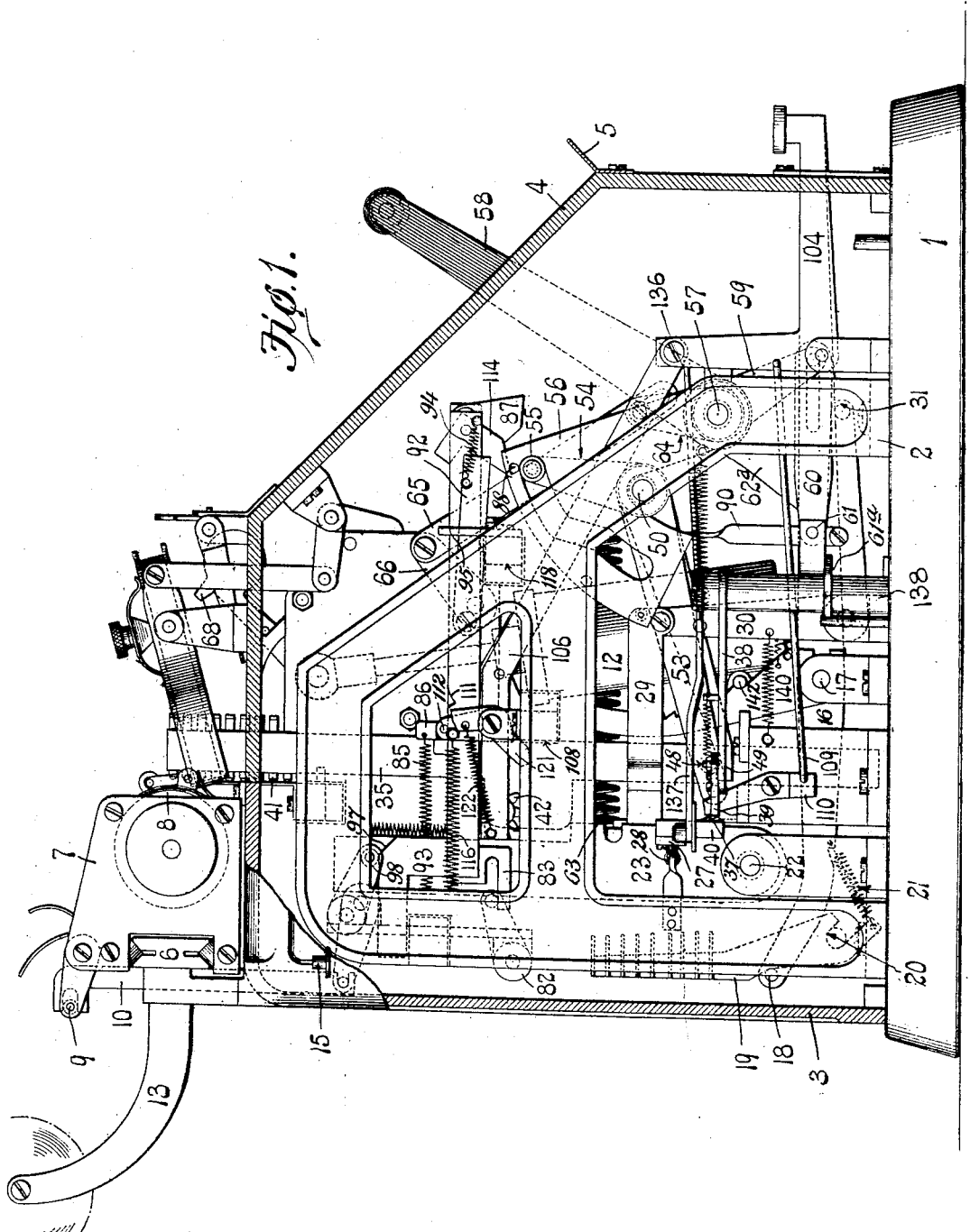

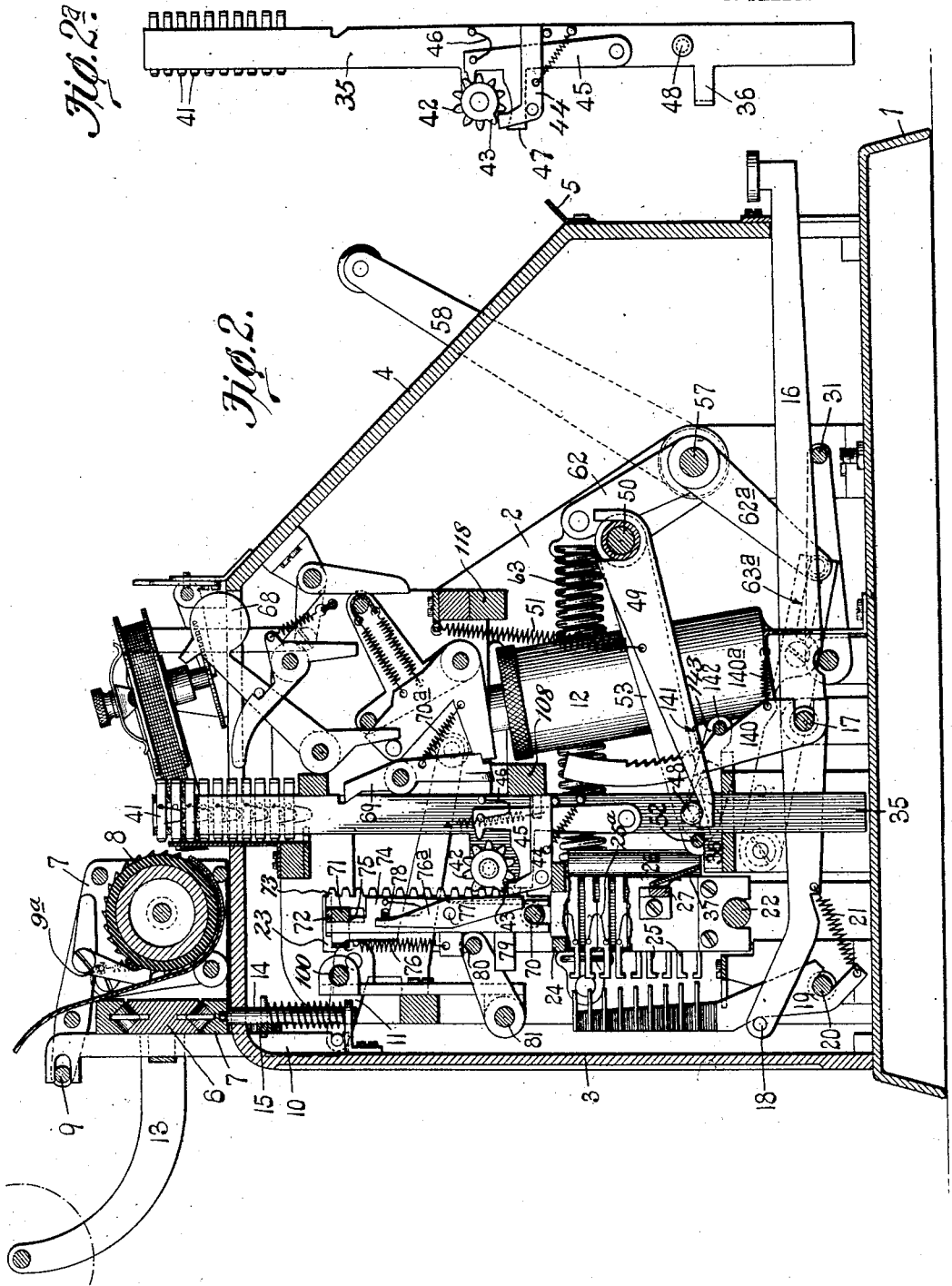

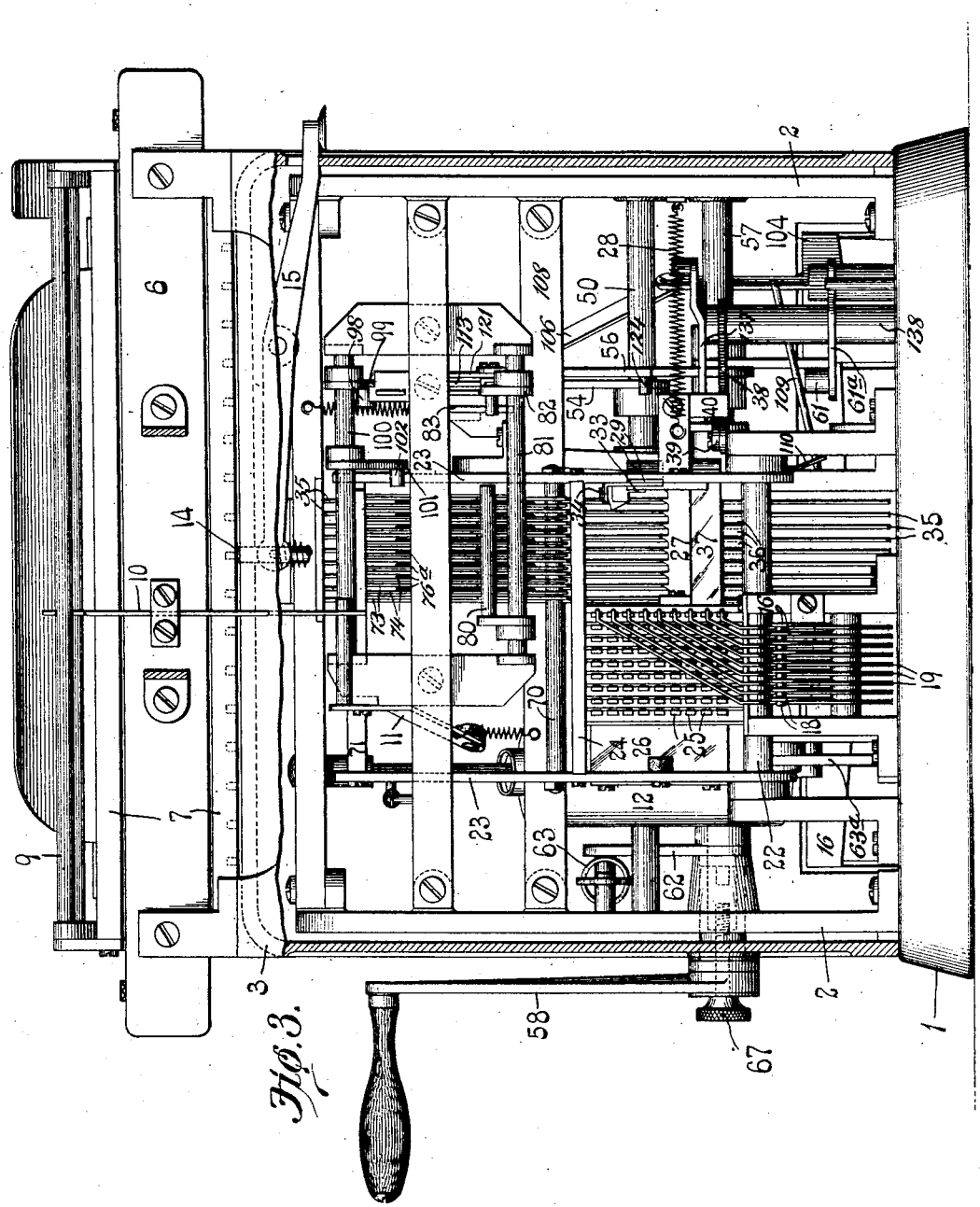

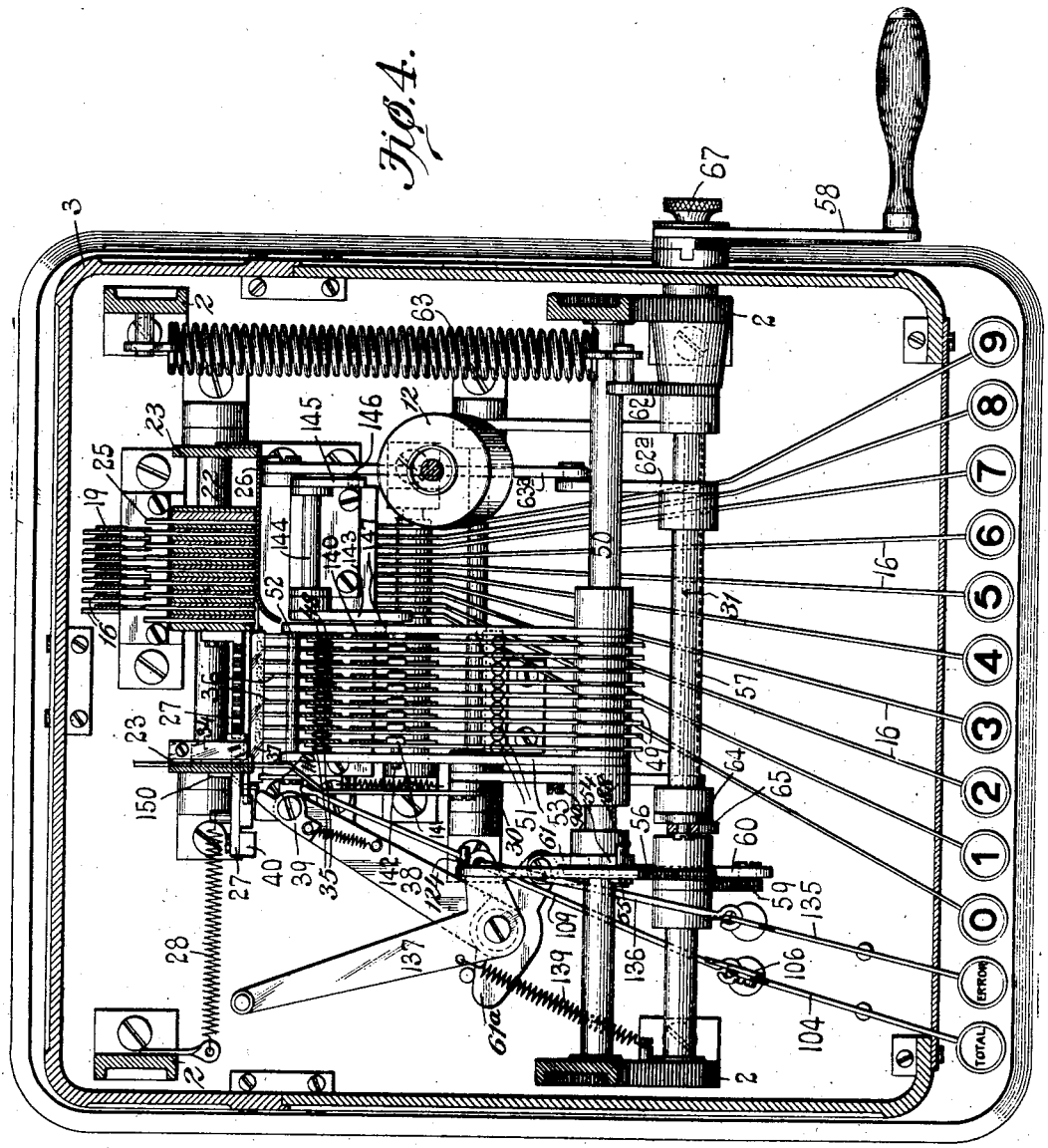

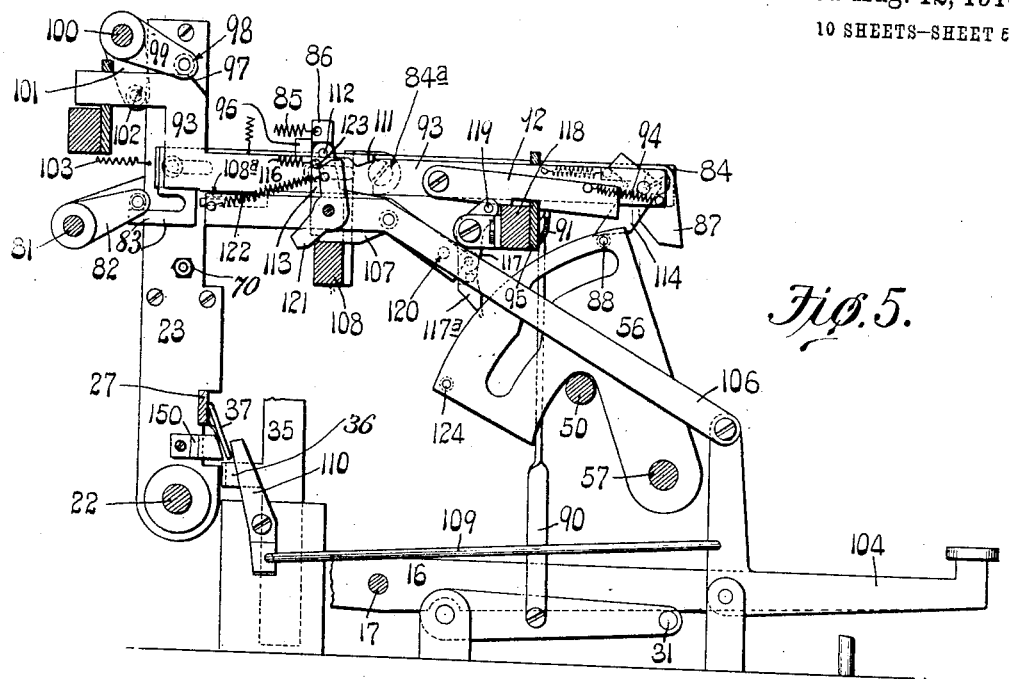
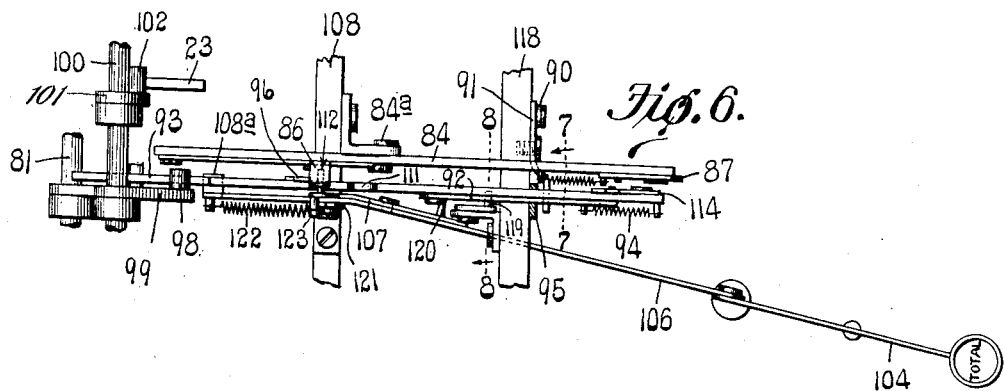
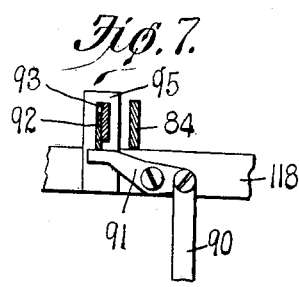
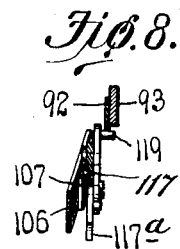

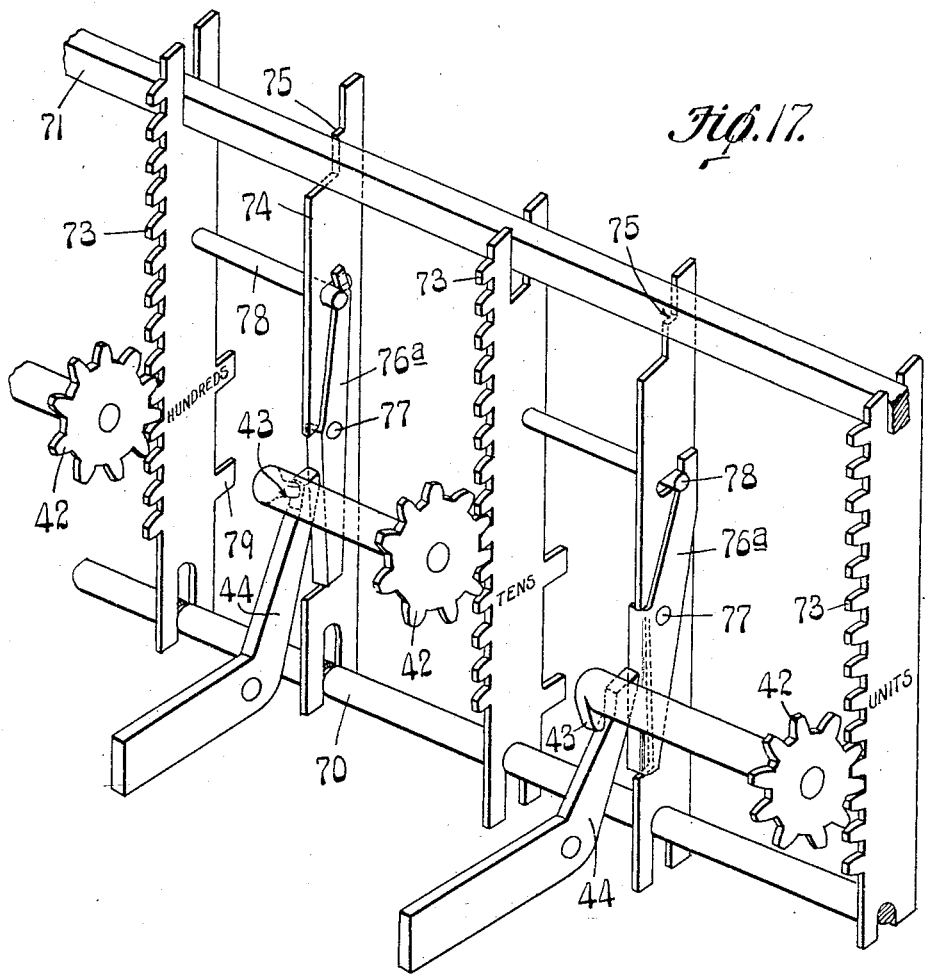

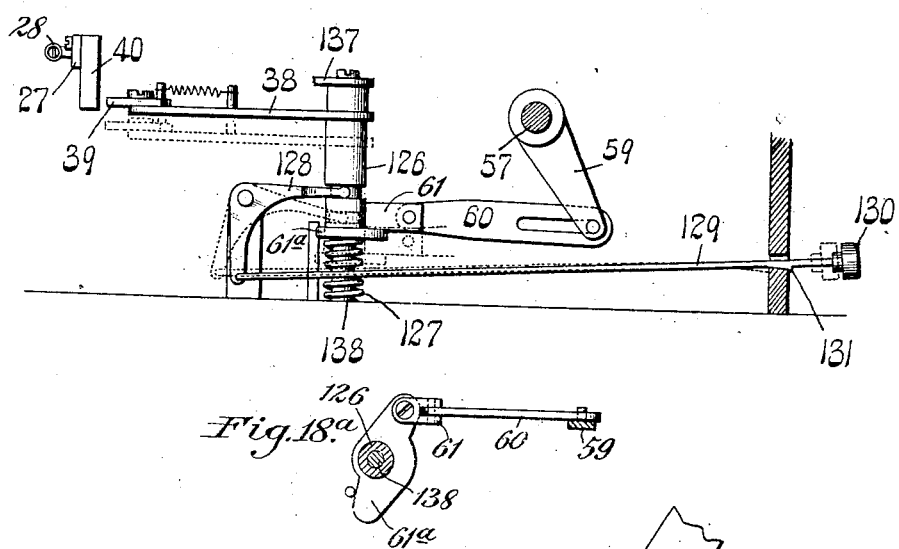
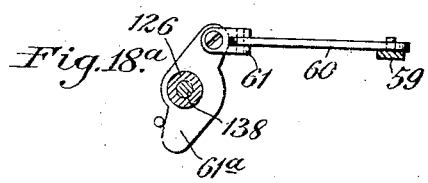
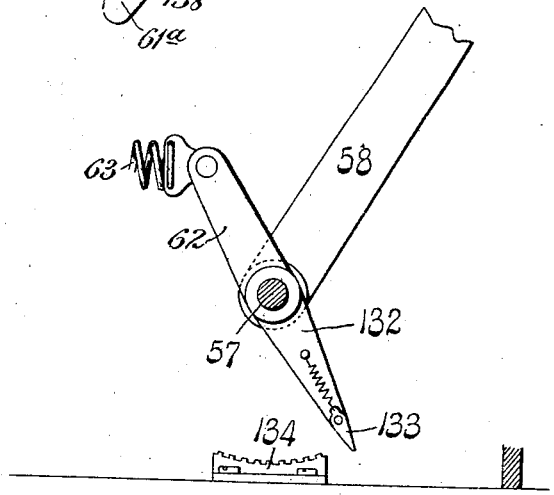

W. W. HOPKINS.
CALCULATING MACHINE.
APPLICATION FILED JUNE 18, 1908.
1,069,953.
Patented Aug. 12, 1913.
10 SHEETS—SHEET 10.
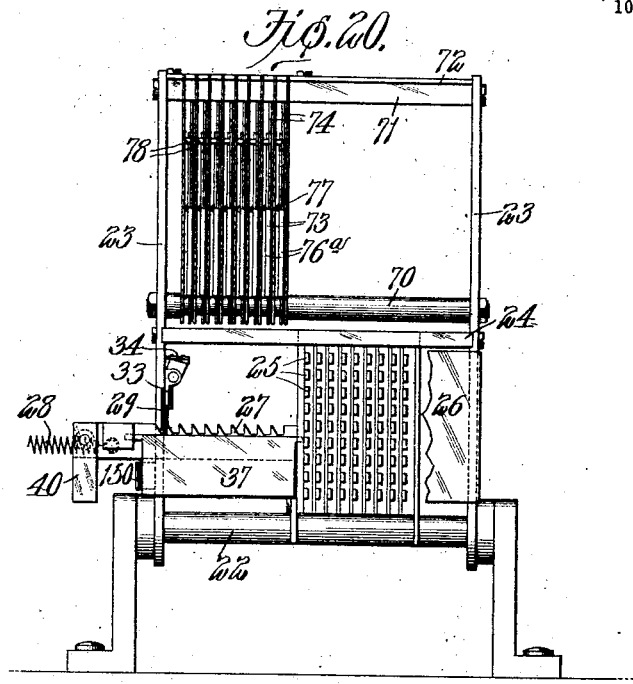
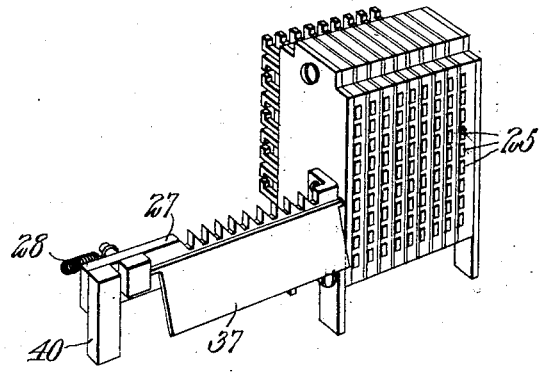
Witnesses:
George Radson
A. J. McCauley
Inventor,
William W. Hopkins,
By Bakewell Cornwall
Attys.

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,069,953.     Specification of Letters Patent.     Patented Aug. 12, 1913.

Application filed June 18, 1908. Serial No. 439,147.

*To all whom it may concern:*

Be it known that I, WILLIAM W. HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a side elevational view, the near side wall of the casing being removed to more clearly illustrate the working parts of the machine; Fig. 2 is a vertical longitudinal view through the machine; Fig. 2ª is a detail view of one of the type carriers and its associate parts; Fig. 3 is a rear elevational view of the machine, the rear wall being cut away to more clearly show the interior mechanism; Fig. 4 is a horizontal sectional view showing the plan of the key board; Fig. 5 is a side elevational view of the total key mechanism; Fig. 5ª is a similar view showing the total key depressed; Fig. 5ᵇ is a similar view showing the position of certain parts in retaining the total in the machine; Fig. 5ᶜ is a similar view showing the position of the parts when the total key is released after the handle has reached its home position; Fig. 5ᵈ is a sectional view on line *d—d* Fig. 5ª; Fig. 6 is a plan view of the mechanism shown in Fig. 5; Fig. 7 is a sectional view on the line 7—7 of Fig. 6; Fig. 8 is a sectional view on the line 8—8 of Fig. 6; Fig. 9 is a side elevational view of the carrying mechanism; Fig. 10 is a front view of the same; Fig. 11 is a side elevational view of the carrying mechanism in its carrying position; Fig. 12 is a sectional view on the line 12—12 of Fig. 10; Fig. 13 is a side elevational view of the escapement mechanism and the traveling carriage; Fig. 14 is a similar view showing the parts in a different position; Fig. 15 is a sectional view on the line 15—15 of Fig. 13; Fig. 16 is a sectional view on the line 16—16 of Fig. 14; Fig. 17 is a conventional illustration of the carrying mechanism; Fig. 18 is a detail view of the repeat key and its connections; and Fig. 18ª is a plan view of the connection between the power shaft 57 and the rotatable hub 126 shown in Fig. 18; Fig. 19 is a detail view of the full stroke mechanism of the power shaft; Fig. 20 is an elevational view, as seen from the front of the swinging frame and its traveling carriage, the stop-pin-restoring plate 26 being broken away to more clearly illustrate the traveling carriage; and Fig. 21 is a detail view of the traveling stop carriage and its associate parts.

This invention relates to a new and useful improvement in calculating machines, the object being to simplify the construction of machines of this character, cheapen the cost of manufacture by having practically all of the moving parts of the machine of stamped metal, and to provide means whereby the moving parts of the machine, in their active movements, are positive.

With these objects in view, the invention consists in the construction, arrangement and combination of the several parts of the machine all as will be hereinafter described and afterward pointed out in the claims.

*The frame and casing.*—In the drawings, 1 indicates the base of the machine, which is preferably in the form of a casting, from which rise two side frame plates 2 connected together by suitable cross bars, and which frame plates afford bearings for the cross shafts of the machine.

3 is the rear portion of the casing, and 4 the front portion thereof, the casing being divided vertically and the parts being fitted together by a rabbeted joint (see Fig. 4.) The front section of the casing is provided with a shelf 5 used to support checks, bills, etc. to be added.

*The paper carriage.*—6 indicates a track secured to the rear section 3, and on which is slidingly mounted the frame 7 of the laterally adjustable carriage see Fig. 2. In this carriage is a rotating platen 8 provided with the usual ratchet and pawl mechanism whereby it may be rotated manually or mechanically.

9 indicates a bail mounted on the carriage frame, which bail coöperates with a paper-feeding pawl 9ª, see Fig. 2 and also with a bar 10, see Fig. 3 which bar coöperates at its lower end with a lever 11 whose forward end is arranged over the dash pot 12 used to cushion the stroke of the machine. Every time the operating handle is pulled the dash pot is raised, and, coming in contact with the lever 11, operates the paper-feeding mechanism to line-space the different items.

13 indicates a bracket in which may be mounted a roll of paper whereby the items may be printed and added together on a narrow strip. Wide sheets of paper, however, may be introduced into the paper carriage whereby parallel columns may be printed upon the same sheet.

The carriage is normally locked in position by means of a spring-pressed pin 14 (see Fig. 3), which extends through the top of the casing and into one of the series of notches in the bottom bar of the carriage. This pin 14 may be operated by a lever 15 which extends out through the casing. Raising the protruding end of lever 15 depresses the pin 14 and enables the carriage to be adjusted laterally by hand to the desired position, or approximately thereto, after which the lever 15 is released and the pin 14 permitted to engage one of the notches to lock the carriage against displacement.

The inking ribbon shown in the drawings may be arranged on spools and fed in the usual way past appropriate guides between the printing type and the paper in the paper carriage. The construction shown is illustrated in United States Letters Patent No. 860,297, granted to me July 16, 1907, and therefore need not be described in detail here.

*The key-board.*—The key-board consists of ten digit keys being numbered from 1 to 9, the zero key, together with a "total key", an error key, and a repeat key (if repeating operation is desired). Each of the digit keys consists of a head on the end of the key bar 16, said key bar being pivoted on a rod 17. The rear end of each key bar is provided with a lateral projection or pin 18 which coöperates with a push lever 19. These push levers, as I have termed them (there is one for each digit key including the zero but excepting the "9" key) are pivotally mounted on a shaft 20 and connected to their complementary key bars respectively by a spring 21, which spring not only serves to hold the push bar in its normal position but also the key bar. Each push bar is provided at its upper extremity with a forwardly extending push finger for setting up the stop pins in the traveling carriage. The push fingers are in vertical alinement, as shown, and uppermost finger being identified with the "8" digit key, the lowermost with the "0" digit key, the intermediate fingers being identified with the other digit keys from "1" to "7" inclusive in a progressive order, the "1" being the push finger next to the zero key at the bottom.

*The traveling stop carriage.*—22 indicates a shaft mounted in suitable brackets extending up from the base 1, which shaft constitutes a track on which the traveling carriage is supported and runs, and also a pivot rod for a frame 23 (see Fig. 5). This frame 23 is connected together by transversely arranged shafts and bars, but for the present I will refer only to two of these cross bars 24 which serve to support and guide the upper portion of the traveling carriage.

25 indicates stop pins arranged in the traveling carriage in vertical series, said stop pins, for simplicity of manufacture, being connected together in pairs by U-shaped springs which exert their energies expansively so that when the stop pins are home they are held there by friction against accidental displacement, and when said stop pins are pushed forwardly by one of the push fingers the springs act expansively to hold said stop pins in their forward position.

25ª indicates the U-shaped spring above referred to, which spring may be in the form of a wire or flat leaf spring, its ends preferably being bent so as to form eyes whereby said spring may be pivotally connected to a pair of stop pins. A pair of pins is illustrated, both of said pins being retracted. When one of the pins is pushed forwardly the spring 25ª is not only acting expansively to hold the projected pin of the pair forward, but is exerting the same amount of pressure in holding the other pin of the pair in its retracted position. The contiguous edges of the pair of pins are free to move without frictional contact with each other, and consequently the movement of one pin cannot possibly, so far as frictional contact is concerned, exert any tendency to move its companion pin. The spring 25ª, acting expansively at all times, tends to force the pins of a pair, to which it is connected, away from each other, so that their back edges are in frictional contact with the edges of their guiding openings. This frictional contact is sufficient to hold the pins in their normal position.

The means for restoring the stop pins is a plate 26 (see Fig. 4) which is mounted upon one of the side members of the frame 23 and which has its free edge inclined or beveled so as to cause all of the positioned stop pins to be forced rearwardly to their home position when the carriage is restored. In restoring the carriage it is necessary to move it to the right slightly beyond its home or starting position so as to insure the restoration of the stop pins in the left-hand series.

27 indicates a toothed bar secured to the carriage, to which bar is connected a spring 28 by which the carriage is moved leftwardly. An escapement mechanism controls the movement of the carriage from right to left, and this consists (see Figs. 4 and 13 to 16) of a bar 29 slidingly mounted in one of the side pieces of the frame 23 and connected to the upper member of a bell crank lever 30 (see Fig. 1). The forwardly extending member of this bell crank lever carries a bar 31 which lies under the digit keys so that whenever one of said digit keys (including the zero key) is depressed, the bell crank lever is operated and the bar 29 vibrated. Bar 29 is provided with a notch 32 which normally registers with the teeth of bar 27 (see Fig. 13). A pivoted escapement pawl 33 is mounted on the bar 29, the lower end of this escapement pawl being arranged opposite the notch 32, and consequently said escapement pawl is normally in engagement with the ratchet-like teeth of bar 27. A flat leaf spring 34 bears on the top flat face of pawl 33 and tends to hold the lower end of said pawl away from the bar 29, as shown in Fig. 16.

The parts normally lie in the position shown in Figs. 13 and 15, and when one of the digit keys, including the zero key, is operated the bar 29 is moved to the position shown in Figs. 14 and 16, in which the escapement pawl 33 is permitted to move away from the bar 29 in readiness to engage the next adjacent tooth of bar 27. The bar 29, however, holds the traveling carriage stationary during the depressing movement of the key, so that the push finger will co-operate with the stop pin and fully set up said stop pin. When the key is released, however, the bar 29 is restored home and the escapement pawl engages the next tooth. The traveling carriage then takes its step to the left, advancing the stop pin of the first series in line with the type carrier identified with the units column. The next operation of one of the digit keys will, upon depressing movement of the key, set up another stop pin, and upon the releasing movement of said key advance the carriage another step to the left, placing the stop pin in the first row in line with the tens type carrier and the stop pin of the second row, the one last set up, in line with the units type carrier. In this manner each successively operated key advances the stop carriage one step to the left.

The type carriers consist of bars 35 which are guided vertically by appropriately slotted cross bars, said type carrying bars being provided with rearwardly extending shoulders 36. 37 indicates a hinged plate hinged to the stop carriage (see Figs. 2, 4 and 5), which lies over all of the shoulders 36 when the stop carriage is home. When, however, a digit key is depressed and the carriage moves one step to the left the plate 37 is moved with it, and such movement releases the units type carrier. The next step of the carriage to the left upon the operation of another key will cause said plate to release the next adjacent or tens type carrier, this progressive release of the type carriers continuing successively upon the operation of each key as the type carriers are brought under control of a positioned stop.

The means for restoring the stop carriage consists of an arm 38 (see Fig. 4) carrying a tappet 39 at its rear end, which tappet engages a block 40 on the end of the toothed bar 27. The sweep of the restoring arm must of course be great enough to include the block 40 in the various positions of the carriage up to the full capacity of the machine. The operating handle causes this pivotally mounted restoring arm 38 to swing to the left on the forward movement of the handle, tappet 39 passing the block 40 without disturbing the position of the carriage, and then when the handle is returned to its normal position the tappet, in its sweep, engages the block 40 and moves the carriage to the right past its home position (so that the plate 26 will restore all of the stop pins), the tappet eventually passing beyond the block 40 as shown in Fig. 4, permitting the carriage, under the influence of its spring 28, to move to its normal home position which is established by the first tooth of the bar 27 engaging the escapement pawl 33.

*The type carriers.*—As shown in Fig. 2 each type carrier consists of a bar 35 and its shouldered stop 36, heretofore described, which stop is preferably bent at its extremity so as to increase the bearing surface which is designed to come in contact with the positioned stop pin in its path of movement, which stop pin arrests the type carrier in its proper position. At the end of each type carrier are the printing type 41 which, as shown in Fig. 2, consist of separately movable type normally held retracted by suitable springs, the uppermost row of type, carrying the zero printing characters, being in the printing line opposite the platen 8.

The inking ribbon, as shown in Fig. 2, is, when the operating handle is home, dropped below the printing line, but when the handle is moved after an item has been set up on the key board, this inking ribbon is raised to the printing line in front of the type to be struck by the printing hammers. As before stated, this forms part of my before mentioned patent and I do not deem it necessary to describe the means for accomplishing this result in this application.

In addition to the printing type, each type carrier carries a freely-rotatable totalizer wheel 42, said totalizer wheel being provided with one wide tooth or a tripping projection 43. Each type carrier is also provided with a tripping pawl 44. The function of this pawl is to provide a stop for the tripping projection in the reverse rotation of the wheel in taking a total, and also to effect the carrying from one rack bar to the next adjacent rack bar of higher order. The type carriers are also provided with detents 45 pivotally mounted thereon, the tooth on the free end of which is normally held against the totalizer wheel 42 by means of a light spring 46.

47 indicates a projection extending rearwardly from the detent in the path of a rack. When the frame 23 in which the racks are mounted is moved rearwardly, the detents are permitted to engage the totalizer wheels and prevent rotation of said wheels while out of engagement with the racks. When, however, the frame 23 is rocked forwardly so as to engage the racks with the totalizer wheels the detents are coincidently disengaged from the said totalizer wheels. The racks are stationary except for the one tooth displacement incident to carrying, and consequently the racks serve to lock the totalizer wheels against accidental rotation, or to rotate said wheels a distance of one tooth in carrying during the time that the detent 45 is out of engagement with the wheels. At all other times when the racks are out of engagement with the wheels the detent locks said wheels against displacement.

The type carrying bars are provided with pins or projections 48 under which are located the free ends of lifting bars 49 pivoted in the grooves of a sleeve loosely mounted upon a shaft 50 and connected to a spring 51 which tends at all times to raise said bars and their carried type carriers.

The type carriers are restored to their normal or lowered position by means of a bar 52 operating above stop shoulders 36, said bar being mounted between arms 53 fixed to the shaft 50. Shaft 50 is provided with a rock arm 54 (see Fig. 1) having a roller 55 at its free ends extending into the cam slot of a cam 56. This cam plate 56 is mounted on a power shaft 57 operated in this instance by an operating handle 58.

*The operating handle and its connections.*—The operating handle 58 may of course be dispensed with and a motor connected to the power shaft to drive the same in any of the wellknown ways. I am not concerned in this application with mechanical means for driving the power shaft, and have therefore illustrated the manually operable handle 58. The power shaft 57 in addition to carrying the cam plate 56, whose cam slot operates the restoring bar of the type carriers also operates the carriage-restoring sweep arm in the following manner: A rock arm 59 (see Fig. 1) has a slot and pin connection with a link 60, which link (see Fig. 4) is connected to a universal link 61 in turn connected to the plate 61ª on the lower end of the hub of the sweep arm 38. Thus, whenever the power shaft is operated the sweep arm 38 is also operated. The power shaft is provided with a rock arm 62 to which is connected a returning spring 63 (see Figs. 2 and 4), which spring tends to return the power shaft to its home position after the handle or other means connected to said shaft has caused the same to be rocked forward. A rock arm 62ª is also fixed to said shaft (see Fig. 2) which has a slot and pin connection with a lever 63ª on which is mounted the dash pot 12. Whenever the power shaft is operated lever 63 is raised, raising with it the dash pot whose plunger is on a piston rod pivotally mounted on one of the transverse shafts extending between the upper ends of the side frame plates 2, as shown in Fig. 3. The power shaft is also provided with a rock arm 64 which has a slot and pin connection with a link 65 connected to a rock arm 66 identified with the mechanism for releasing and restoring the printing hammers. The operating handle 58 is secured to the power shaft by means of a screw bolt having a milled head 67 (see Fig. 3). In this manner the handle may be removed from the shaft when it is desired to remove the casing as is well known in adding machine constructions.

*The printing mechanism.*—The hammers 68 for effecting a printing impression through the medium of the printing type may be of any desired form and operated by any appropriate mechanism; but I have shown these type hammers in the accompanying drawings as being the same as those illustrated in United States application filed by Hubert Hopkins on or about April 9, 1906, Serial No. 310,739, and illustrated in Belgian Patent No. 202,081, dated August 21, 1907, said hammers being controlled by mechanism the same as that disclosed in said application and patent with the exception of the primary releasing pawl 69, whose upper end is held in the cam-faced notch in the type carrier by means of a spring 70ª (see Fig. 2). The springs 70ª are absent from the structures illustrated in said application and patent.

*The carrying mechanism.*—70 and 71 are cross bars mounted in the frame 23, bar 70 being preferably round and grooved to provide a spaced bearing for the racks and their associate carrying plates, while the bar 71 is preferably rectangular, and has attached to its upper side a comb plate 72 which acts as a guide for the racks and their associate carrying plates.

73 indicates the racks, as shown in Figs. 9 and 11 which are provided with bifurcated ends to slidingly engage the bars 70 and 71, said sliding engagement being necessary to effect the carrying from one bar to the next adjacent bar in advance.

74 indicates a carrying plate as shown in Fig. 17 which is pivotally and slidingly mounted on the bar 70, the upper end of said carrying plate being provided with a shoulder 75 which normally rests under the bar 71. Each rack bar except the first one to the right-hand end of the series is provided with its complementary carrying plate connected thereto by a slot and pin connection of such character that the carrying plate is permitted to be tilted rearwardly independently of the rack bar, moving about the bar 70 as its axis, until its shoulder 75 passes from under the bar 71, in which event a spring 76 connected to the rack bar raises said rack bar and its tilted carrying plate a distance equal to one tooth. The carrying plate is of course tilted by the tripping projection on the next adjacent totalizer wheel of lower order, which tripping projection effects the carrying in passing from "9" to "0" (note left-hand side Fig. 17).

The tripping pawl 44 is the medium through which the tripping projection on the next adjacent wheel or lower order acts in tilting the carrying plate and permitting it and the rack to rise in carrying. The tripping pawl 44 may operate upon the forward face of the carrying plate at any point throughout the travel of said tripping pawl along said face. Should the tripping pawl be near the upper end of the carrying plate when it is operated by the tripping projection on the next adjacent wheel of lower order, it is obvious that but little power is required to tilt the carrying plate. If the tripping pawl is operated when in its home or near its home position, as illustrated in Fig. 2, its relation to the pivot rod 70 on which the tilting plates move is such that considerable more power would be required to operate the plate under such circumstances than was required when the tripping pawl was near the upper end of the plate, as above explained. I have provided means to obviate the necessity for this disproportioned power, which means is in the form of an equalizer whereby the ordinary operation of tripping the pawl 44 will operate the carrying plate. This equalizing device is in the form of a lever 76ª pivoted at 77 to the carrying plate and having its lower end flanged or bent over so as to take the place of the lower portion of the front edge of the carrying plate, which is cut away at this point to accommodate the equalizing device. The upper end of the equalizing device coöperates with a pin 78 of the slot and pin connection between the carrying plate and the rack, said pin being fixed in the rack and passing through a horizontally disposed slot in the carrying plate. In this manner the pin 78 forms a fulcrum for the equalizing lever 77 whose weight is the carrying plate and whose power is applied through the medium of the tripping pawl 44. The equalizing device thus becomes a lever of the second order.

Above the pivotal point of the equalizing device the tripping pawl acts directly upon the carrying plate, while below that point the tripping pawl acts upon the equalizing device. Thus the greatest amount of power to be delivered through the tripping pawl in operating the tilting plate is at a point approximately opposite the pivotal point of the equalizing device, while above and below said point less power is proportionately required as the distance increases from said point.

*Restoring the racks.*—Each rack bar is provided with a rearward extension 79, with the upper end of which coöperates a bar 80 mounted in a rock arm arranged on a shaft 81. This shaft is operated by a rock arm 82 (see Fig. 2) whose lateral extension or pin rests upon the lower wall of a recess or slot in a plate 83. The plate 83 is mounted by a slot and pin connection upon a bar 84 and is held rearwardly by means of a spring 85 secured to a bent, upwardly-extending projection 86. The forward end of bar 84 is provided with a tappet 87, which tappet coöperates with a pin 88 on the cam plate 56. Thus, whenever the power shaft is rocked forward the pin strikes the cam face on the under side of the tappet, depressing the rear end of the lever or bar 84 (which is pivoted to the framing of the machine at 84ª, see Fig. 6), which causes the rear end of said lever to be depressed; and on account of the flat bottom face of the tappet 87 the rear end of the lever 84 is held depressed for a brief period of time, this pause in the operation of lever 84 being necessary to enable the shoulders of the carrying plates to move under the bar 71.

By referring to Fig. 5 it will be observed that the position of the parts is such that if the power shaft were operated and the bar 84 rocked, the rack-restoring bar 80 would not be vibrated but would rest idly on the projections 79, thus permitting the handle to make repeated operations without restoring any of the displaced racks or other associate parts. This feature is necessary in the present machine on account of the relation between the totalizer wheels and the racks, to wit, that of normal engagement. To restore the racks during such engagement would result in reversely rotating the meshed totalizer wheel one tooth; or, should the said wheel be with its zero stop against the tripping pawl 44, the breakage of some of the parts would result. The upper wall of the slot in the rear end of plate 83 is therefore cut away so that when the handle is pulled and no digit keys have been depressed the racks will not be restored.

*Means for disengaging and engaging the totalizer wheels and racks.*—The totalizer wheels, being mounted upon stud shafts on the type carriers, are only bodily movable said carrying plate being provided with a shoulder 75 which normally rests under the bar 71. Each rack bar except the first one to the right-hand end of the series is provided with its complementary carrying plate connected thereto by a slot and pin connection of such character that the carrying plate is permitted to be tilted rearwardly independently of the rack bar, moving about the bar 70 as its axis, until its shoulder 75 passes from under the bar 71, in which event a spring 76 connected to the rack bar raises said rack bar and its tilted carrying plate a distance equal to one tooth. The carrying plate is of course tilted by the tripping projection on the next adjacent totalizer wheel of lower order, which tripping projection effects the carrying in passing from "9" to "0" (note left-hand side Fig. 17).

The tripping pawl 44 is the medium through which the tripping projection on the next adjacent wheel or lower order acts in tilting the carrying plate and permitting it and the rack to rise in carrying. The tripping pawl 44 may operate upon the forward face of the carrying plate at any point throughout the travel of said tripping pawl along said face. Should the tripping pawl be near the upper end of the carrying plate when it is operated by the tripping projection on the next adjacent wheel of lower order, it is obvious that but little power is required to tilt the carrying plate. If the tripping pawl is operated when in its home or near its home position, as illustrated in Fig. 2, its relation to the pivot rod 70 on which the tilting plates move is such that considerable more power would be required to operate the plate under such circumstances than was required when the tripping pawl was near the upper end of the plate, as above explained. I have provided means to obviate the necessity for this disproportioned power, which means is in the form of an equalizer whereby the ordinary operation of tripping the pawl 44 will operate the carrying plate. This equalizing device is in the form of a lever 76ª pivoted at 77 to the carrying plate and having its lower end flanged or bent over so as to take the place of the lower portion of the front edge of the carrying plate, which is cut away at this point to accommodate the equalizing device. The upper end of the equalizing device coöperates with a pin 78 of the slot and pin connection between the carrying plate and the rack, said pin being fixed in the rack and passing through a horizontally disposed slot in the carrying plate. In this manner the pin 78 forms a fulcrum for the equalizing lever 77 whose weight is the carrying plate and whose power is applied through the medium of the tripping pawl 44. The equalizing device thus becomes a lever of the second order.

Above the pivotal point of the equalizing device the tripping pawl acts directly upon the carrying plate, while below that point the tripping pawl acts upon the equalizing device. Thus the greatest amount of power to be delivered through the tripping pawl in operating the tilting plate is at a point approximately opposite the pivotal point of the equalizing device, while above and below said point less power is proportionately required as the distance increases from said point.

*Restoring the racks.*—Each rack bar is provided with a rearward extension 79, with the upper end of which coöperates a bar 80 mounted in a rock arm arranged on a shaft 81. This shaft is operated by a rock arm 82 (see Fig. 2) whose lateral extension or pin rests upon the lower wall of a recess or slot in a plate 83. The plate 83 is mounted by a slot and pin connection upon a bar 84 and is held rearwardly by means of a spring 85 secured to a bent, upwardly-extending projection 86. The forward end of bar 84 is provided with a tappet 87, which tappet coöperates with a pin 88 on the cam plate 56. Thus, whenever the power shaft is rocked forward the pin strikes the cam face on the under side of the tappet, depressing the rear end of the lever or bar 84 (which is pivoted to the framing of the machine at 84ª, see Fig. 6), which causes the rear end of said lever to be depressed; and on account of the flat bottom face of the tappet 87 the rear end of the lever 84 is held depressed for a brief period of time, this pause in the operation of lever 84 being necessary to enable the shoulders of the carrying plates to move under the bar 71.

By referring to Fig. 5 it will be observed that the position of the parts is such that if the power shaft were operated and the bar 84 rocked, the rack-restoring bar 80 would not be vibrated but would rest idly on the projections 79, thus permitting the handle to make repeated operations without restoring any of the displaced racks or other associate parts. This feature is necessary in the present machine on account of the relation between the totalizer wheels and the racks, to wit, that of normal engagement. To restore the racks during such engagement would result in reversely rotating the meshed totalizer wheel one tooth; or, should the said wheel be with its zero stop against the tripping pawl 44, the breakage of some of the parts would result. The upper wall of the slot in the rear end of plate 83 is therefore cut away so that when the handle is pulled and no digit keys have been depressed the racks will not be restored.

*Means for disengaging and engaging the totalizer wheels and racks.*—The totalizer wheels, being mounted upon stud shafts on the type carriers, are only bodily movable is operated, and as the restoring mechanism for the racks has been placed under control of the power shaft by the operation of a key, the initial movement of said power shaft, when the handle first starts on its forward movement, will restore all of the racks and carrying plates to their normal position, while the racks and totalizer wheels are disengaged.

*The total key.*—104 indicates a total key in the form of a bell crank lever and having an appropriately designating head on its outer end, to the inner end of which is connected a link 106, said link carrying a detaining pawl 107, which, when the total key is depressed, is designed to drop in front of one of the cross bars 108 of the machine to hold the total key in its depressed position. The rear end of link 106 is provided with a lateral extension 108ᵃ operating in a slot in the bar 93. In this way the bar 93 can slide in its ways without disturbing the total key. When the total key is depressed the extension 108ᵃ moves forwardly against the front wall of the slot and holds the bar 93 forward, and consequently the frame 23 forward, so that the racks are in engagement with the totalizer wheels during the forward stroke of the handle. The forward stroke of the handle causes the totalizer wheels in mesh with the racks to reversely rotate until arrested in their zero position determined by the tripping pawls 44, in which zero position the printing type indicating the proper total are in printing line. It is obvious that all of the type carriers must be released in taking a total, and this is done by means of a rod 109 connecting the bell crank lever 104 with a lever 110 arranged in front of the latch plate 37. When the total key is depressed the latch plate 37 is moved rearwardly out of the paths of the stop shoulders 36 of the type carriers. Thus all of the type carriers whose totalizer wheels are in other than zero position are permitted to rise. When the total key is released at the extremity of the forward movement of the handle, the spring behind the latch plate forces it forwardly in the paths of the shoulder projections 36 so that when the type carriers are restored to home position said shoulder projections lie under the latch plate.

The means for releasing the total key is a cam face 111 on the bar 93, which cam face coöperates with a pin 112 arranged on an extension 113 rising upwardly from the detaining pawl 107. When the total key is depressed this detaining pawl, as stated before, is moved until it drops in front of the bar 108, and during such forward movement the pin 112 rides on top of the bar 93, and the detaining pawl is permitted to drop in front of the bar 108 on account of the notch, see Fig. 5ᵃ.

114 indicates a tappet on the forward end of the bar 93, which tappet coöperates with a pin 124 mounted near the rear edge of the cam plate 56. When the handle approaches its forward position the pin 124 strikes the tappet 114 and moves the bar 93 forwardly, which movement causes the cam face 112 to lift the detaining pawl 107, whereupon a spring 116 connected to the extension 113 restores the link 106 and its connected parts, including the total key, to their normal position.

To clear the machine after taking a total, that is, to disengage the racks from the totalizer wheels when the wheels stand at zero, means must be provided to effect the rearward movement of the frame 23 when the handle is at its forward position in the total-taking operation. This is accomplished by means of a tappet 117, which tappet is mounted on one of the cross arms 118 of the machine, said tappet carrying a pin 119 lying under the latch plate 92. A forwardly extending projection of the detaining pawl 107 carries a pin 120 which is designed, when the total key is depressed, to tilt the tappet 117 and raise the latch plate 92 out of engagement with its keeper. When the latch plate is thus disengaged, the plate 93 may slide rearwardly, when the pin 124 in engagement with the tappet 114 on the forward end of said plate permits it to do so, and such rearward movement of plate 93 places the cam 97 under the pin 98 and permits the spring connected to the frame 23 to move said frame rearwardly.

Means are provided to retain the total in the machine, and these means consist of a tappet 121 mounted in a bracket on the cross bar 108. A spring 122 holds a tappet normally in the position shown in Fig. 5, in which position when the total key is depressed a pin 123 to which the spring 116 is connected is in a position to rock said tappet forwardly until the pin 111 drops in the notch in the bar 93. When the handle is pulled forward and the bar 93 moved forward by virtue of the engagement between the tappet 114 and pin 124, so as to cause the cam face 112 to lift the detaining pawl, such an operation, as has been before explained, permits the frame 23 to be rocked rearwardly and consequently the racks are disengaged from the totalizer wheels and the machine will stand clear when the handle reaches its home position. This operation, as before explained, also causes the total key to rise when the handle reaches the extremity of its forward movement.

To keep the total in the machine and carry it forward as a sub-total, the total key is held depressed while the handle is returning home. By so holding the total key depressed on the return movement of the handle the pin 120 on the forward extension of the detaining pawl 107 forces the tappet 117, or rather the hinged lower end 117ª thereof, into the path of movement of the pin 124 on the cam plate 56. In this position the pin 124 on the return movement of the handle will strike the hinged portion 117ª of the tappet, which is unyielding in this operation, as indicated by the arrow, Fig. 5ᵇ, and depress said tappet 117 and with it the forward end of the detaining pawl 107. This operation lifts the rear end of the detaining pawl until the pin 112 is above the notch in the bar 93, and a pin 123, to which the spring 116 is connected, is lifted above the upper end of the tappet 121. The tappet 121, by the impelling action of its spring, now moves to the position shown in Fig. 5ᵇ, wherein its upper end is located under the pin 123. When the power shaft reaches its home position and the total key is released, the springs 85 and 116 tend to raise the same by pulling the connecting link 106 and its associate parts rearwardly. As the tappet 121 has been moved under the pin 123 the detaining pawl 107 is held above the bar 108, and consequently will permit the return movement of the link 106 and its associate parts to home position, as shown in Fig. 5ᶜ. In this position of the parts the frame 23 is rocked rearwardly and the racks are out of engagement with the totalizer wheels, but this disengagement only exists after the sub-total has been retained in the machine and until the handle is again operated either to introduce an item or take the total and clear the machine.

*Repeating an example in the machine.—* Referring to Fig. 18, it will be observed that the sweep arm 38 which carries the tappet 39 at its end to engage the block 40 on the bar 27 of the traveling carriage is mounted upon a vertically movable sleeve 126 which is normally held in its elevated position by a spring 127 arranged thereunder. The bell crank lever 128 has a bifurcated forward end engaging an annular groove in the sleeve 126. A rod 129 connects with the other end of said bell crank lever, said rod carrying a head 130 appropriately marked "Repeat" key upon its outer end in front of the vertical wall or face plate of the casing. This rod 129 is provided with a shoulder 131, which, when the repeat key is pushed in, is designed to engage the wall of the casing and hold said repeat key in such inner position for repeated operations of the power shaft. When the repeat key is pushed in, as shown by dotted lines in Fig. 18, the sweep arm 38 is depressed so that the tappet 39 travels in a plane below the block 40, and consequently will not restore the traveling carriage upon the return movement of the operating handle. Repeated operations of the power shaft will therefore successively introduce the item set up on the stop pins in the positioned carriage a number of times, in the totalizer wheels. When the desired number of operations have been performed the repeat key may be released by being lifted, whereupon the sweep arm returns to its normal position.

*Compelling a full stroke of the handle.—* In Fig. 19 I have shown the rock arm 132 in which is arranged a tappet 133 designed to swing in each direction to coöperate with the rack plate 134 mounted on the base plate of the machine. When the operating handle 58 is pulled forward the tappet 133 will ride over the rack 134, but by engaging the teeth thereof prevent return movement of the handle until said tappet has passed the rack and swung to an alining position with its carrying rack arm behind said rack, whereupon the handle will start on its return movement. Any form of full stroke mechanism may be employed.

*The error key.—* Referring to Figs. 1, 4 and 18, 135 indicates an error key in the form of a bell crank lever having an appropriately marked head on its outer end, while its inner end is connected by means of a link 136 to the short member of a bell crank lever 137 mounted on the upper end of a post 138 on which the hub of the sweep arm 38 is mounted. A spring 139 tends to hold the arm 137 retracted and the error key in its raised position. The rear end of arm 137 lies in the path of movement of the block 40 so that if an error is discovered in an example set up on the key board, and it is desired to cancel said error and not introduce it in the totalizer, the error key can be depressed with the result that the sweep arm 137 engages the block 40 and restores the traveling carriage to its home position retracting all of the positioned stops. After operating the error key the operator can reintroduce the example into the traveling carriage through the key board.

*Preventing idle movement of the type carriers.—* In taking a total the plate 37 which successively releases the type carriers in ordinary operations of the machine is, as before described, moved rearwardly upon the depression of the total key so as to release all of the type carriers. When the handle is pulled forward the restoring bar 52 is lifted and the type carriers are elevated by means of the spring-impelled arms 49, reversely rotating the totalizer wheels until the tripping projection thereof comes in contact with the upper face of its coöperating tripping pawl 44, which establishes the zero position of the totalizer wheel. When the handle reaches its forward position it trips the type hammers so as to make a printed record of the total. The initial rearward movement of the handle, if it is not desired to keep the total in the machine and the total key rises when the handle reaches the forward limit of its movement, causes the frame 23 to rock rearwardly and disengage the racks from the totalizer wheels. When the racks are so disengaged from the totalizer wheels the spring-impelled arms 49 would, if nothing were present to prevent it, lift all of the type carriers whose wheels did not stand at "9" to the "9" position. This is undesirable because it is an unnecessary idle movement and all of the type carriers moving in unison to the "9" position would make considerable noise and impart quite a jar to the machine. I therefore deem it desirable to prevent this unnecessary movement to the idle rack bars and do so in the following manner: 140 represents a series of pivoted racks having ratchet teeth on their forward edges (see Fig. 2) with which coöperate lateral projections 141 on the lifting bars 49, (see Fig. 4). The pivoted racks 140 are normally held rearwardly and out of engagement with the projections 141 by means of a bar 142 carried by a rock arm 143 (see Fig. 4) on a rock shaft 144 provided with a rock arm 145 in the path of a pin 146 on the lever 63 which carries the dash pot. The rock arm or tappet 145 is so positioned relatively to the pin 146 (see Fig. 2) that as the handle approaches the limit of its forward movement the pin 146 on the lever 63 will strike the rock arm or tappet 145, lifting the same and with it the bar 142. Bar 142, as shown in Fig. 2, requires very little motion to release the pivoted racks 140, as said bar rests slightly against shoulders on the pivoted racks, and when lifted will enable said racks to move forward under the impelling action of their springs 140ª, such forward movement causing the cam faces of the pivoted racks to further lift the bar 142 away from its restraining shoulder. In this manner the pivoted racks 140 move forward just about the time that the printing hammers are making the impression, and consequently the type carriers are in their printing position and stationary. The ratchet teeth on the pivoted racks 140 engage the projections 141 on the lifting arms and consequently when the handle starts on its rearward movement and disengages the racks from the totalizer wheels, the type carriers are prevented from rising. Of course when the restoring bar 52 engages the shoulder projections 36 of the type carriers, depressing the type carriers, the ratchet teeth on the pivoted racks permit such downward movement of the type carriers.

To position the bar 142 in front of its shoulders, the arm 143 which carries said bar is provided with a pin 147 which lies in the path of one of the rock arms 53 which carries the restoring bar 52. When the arm 53 and its carried restoring bar are approaching home position said arm engages the pin 147 after the bar 142 has left the last ratchet tooth and forces said bar to its home position under the shoulders of the pivoted rack 140. I have stated above in connection with the reason for these pivoted racks 140 that if the same or equivalent means were not present to restrain the upward movement of the type carriers said type carriers would rise to their "9" position when the handle started on its return movement in taking a total. The "9" position of the type carriers is the highest point to which said type carriers may move and which is determined by the shoulder 36 striking the forward cross bar 24 of the rocking frame 23. There are no stop pins 25 to be operated by the "9" digit key, but said key merely effects the movement of the traveling carriage one step to the left whenever operated.

*Means for preventing operation of the digit keys when the total key is depressed, and preventing operation of the total key when a digit key is depressed.*—Referring to Fig. 5, 150 indicates a bracket-like projection secured to the frame 23 adjacent the path of travel of the plate 37. In the normal operation of the machine when the plate 37 is in the position shown in Fig. 5, the digit keys may be operated and the plate 37 may travel leftwardly with the carriage past the bracket projection 150. Upon the operation of the first digit key, the plate 37 moves in front of the bracket projection 150 and consequently should the machine stand in this position and the operator seek to operate the total key he cannot do so because the lever 110 which engages the plate 37 cannot move said plate rearwardly on account of the bracket projection 150. In this manner the bracket projection 150 prevents the total key from operating when any digit key has been operated and before the example is introduced into the totalizer. Of course, if the error key is operated to restore the traveling carriage and plate 37, the total key may be operated.

When the carriage is home and the total key is operated as shown in Fig. 5ª, plate 37 is pressed rearwardly in line with the bracket extension 150, and as the total key is locked in its depressed position by the detaining pawl 107 the traveling carriage is thus locked against movement during the total-taking operation, or at least until the handle has reached its forward position. Being held rearwardly, the plate 37 cannot pass the bracket extension 150, and consequently the traveling carriage can not be moved from its home position, and thus the operation of the digit keys is prevented.

I am aware that minor changes in the construction, arrangement and combination of the several parts of my device can be made and substituted for those herein shown and described without in the least departing from the nature and principle of my invention.

Having thus described the invention, what is claimed as new and desired to be secured by Letters Patent is:

1. In a calculating machine, the combination of key-positioned stops, totalizer wheel supports controlled thereby, and totalizer wheels carried by said supports; substantially as described.

2. In a calculating machine, the combination of key-positioned stops, independently movable totalizer wheel supports controlled thereby, and totalizer wheels carried by said supports; substantially as described.

3. In a calculating machine, the combination of key-positioned stops, totalizer wheel supports controlled thereby, totalizer wheels carried by said supports, and carrying devices coöperating with said totalizer wheels; substantially as described.

4. In a calculating machine, the combination of key-positioned stops, independently movable totalizer wheel supports controlled thereby, totalizer wheels carried by said supports, and carrying devices coöperating with said totalizer wheels; substantially as described.

5. In a calculating machine, the combination of stops, totalizer wheel supports controlled thereby, totalizer wheels carried by said supports, and racks coöperating with said totalizer wheels; substantially as described.

6. In a calculating machine, the combination of stops, independently movable totalizer wheel supports controlled thereby, totalizer wheels carried by said supports, and normally stationary racks coöperating with said totalizer wheels; substantially as described.

7. In a calculating machine, the combination of stops, independently movable totalizer wheel supports controlled thereby, totalizer wheels carried by said supports, normally stationary racks coöperating with said totalizer wheels, and carrying devices for operating said totalizer wheels through the medium of said racks; substantially as described.

8. In a calculating machine, the combination of a key board, key-positioned stops, totalizer wheel supports controlled thereby, and totalizer wheels carried by said supports; substantially as described.

9. In a calculating machine, the combination of a key board, key-positioned stops, independently movable totalizer wheel supports controlled thereby, and totalizer wheels carried by said supports; substantially as described.

10. In a calculating machine, the combination of a key board, key-positioned stops, totalizer wheel supports controlled thereby, totalizer wheels carried by said supports, and carrying devices coöperating with said totalizer wheels; substantially as described.

11. In a calculating machine, the combination of a key board, key-positioned stops, independently movable totalizer wheel supports controlled thereby, totalizer wheels carried by said supports, and carrying devices coöperating with said totalizer wheels; substantially as described.

12. In a calculating machine, the combination of a key board, key-positioned stops, totalizer wheel supports controlled thereby, totalizer wheels carried by said supports, and racks coöperating with said totalizer wheels; substantially as described.

13. In a calculating machine, the combination of a key board, key-positioned stops, independently movable totalizer wheel supports controlled thereby, totalizer wheels carried by said supports, and normally stationary racks coöperating with said totalizer wheels; substantially as described.

14. In a calculating machine, the combination of a key board, key-positioned stops, independently movable totalizer wheel supports controlled thereby, totalizer wheels carried by said supports, normally stationary racks coöperating with said totalizer wheels, and carrying devices for operating said totalizer wheels through the medium of said racks; substantially as described.

15. In a calculating machine, the combination of a key board, a traveling carriage, stops arranged in said carriage and designed to be set in position by the keys of the key board, totalizer wheel supports controlled thereby, and totalizer wheels carried by said supports; substantially as described.

16. In a calculating machine, the combination of a key board, a traveling carriage, stops arranged in said carriage and designed to be set in position by the keys of the key board, independently movable totalizer wheel supports controlled thereby, and totalizer wheels carried by said supports; substantially as described.

17. In a calculating machine, the combination of a key board, a traveling carriage, stops arranged in said carriage and designed to be set in position by the keys of the key board, totalizer wheel supports controlled thereby, totalizer wheels carried by said supports, and carrying devices coöperating with said totalizer wheels; substantially as described.

18. In a calculating machine, the combination of a key board, a traveling carriage, stops arranged in said carriage and designed to be set in position by the keys of the key board, independently movable totalizer wheel supports controlled thereby, totalizer wheels carried by said supports, and carrying devices coöperating with said totalizer wheels; substantially as described.

19. In a calculating machine, the combination of a key board, a traveling carriage, stops arranged in said carriage and designed to be set in position by the keys of the key board, totalizer wheel supports controlled thereby, totalizer wheels carried by said supports, and racks coöperating with said totalizer wheels; substantially as described.

20. In a calculating machine, the combination of a key board, a traveling carriage, stops arranged in said carriage and designed to be set in position by the keys of the key board, independently movable totalizer wheel supports controlled thereby, totalizer wheels carried by said supports, and normally stationary racks coöperating with said totalizer wheels; substantially as described.

21. In a calculating machine, the combination of a key board, a traveling carriage, stops arranged in said carriage and designed to be set in position by the keys of the key board, independently movable totalizer wheel supports controlled thereby, totalizer wheels carried by said supports, normally stationary racks coöperating with said totalizer wheels, and carrying devices for operating said totalizer wheels through the medium of said racks; substantially as described.

22. In a calculating machine, the combination of stops, type carriers controlled thereby, and totalizer wheels carried by said type carriers; substantially as described.

23. In a calculating machine, the combination with stops, independently movable type carriers controlled thereby, and totalizer wheels carried by said type carriers; substantially as described.

24. In a calculating machine, the combination of stops, type carriers controlled thereby, totalizer wheels carried by said type carriers, and carrying devices coöperating with said totalizer wheels; substantially as described.

25. In a calculating machine, the combination with stops, independently movable type carriers controlled thereby, totalizer wheels carried by said type carriers, and carrying devices coöperating with said totalizer wheels; substantially as described.

26. In a calculating machine, the combination of stops, type carriers controlled thereby, totalizer wheels carried by said type carriers, and racks coöperating with said totalizer wheels; substantially as described.

27. In a calculating machine, the combination of stops, independently movable type carriers controlled thereby, totalizer wheels carried by said type carriers, and normally stationary racks coöperating with said totalizer wheels; substantially as described.

28. In a calculating machine, the combination of stops, independently movable type carriers controlled thereby, totalizer wheels carried by said type carriers, normally stationary racks coöperating with said totalizer wheels, and carrying devices for operating said totalizer wheels through the medium of said racks; substantially as described.

29. In a calculating machine, the combination of a key board, key-positioned stops, totalizer wheel supports controlled by said stops, totalizer wheels carried by said supports, independently movable type carried by said supports, and type hammers coöperating with said type; substantially as described.

30. In a calculating machine, the combination with independently movable totalizer wheel supports, totalizer wheels carried thereby, and normally stationary racks in engagement with said totalizer wheels; substantially as described.

31. In a calculating machine, the combination of stops, supports controlled by said stops, totalizer wheels mounted on said supports, and independently movable type carried by said supports; substantially as described.

32. In a calculating machine, the combination of stops, normally stationary racks, movable supports controlled by said stops, totalizer wheels mounted on said supports, and means for moving said racks into and out of engagement with said totalizer wheels; substantially as described.

33. In a calculating machine, the combination of movable supports, devices for controlling the differential movement of said supports, totalizer wheels carried by said supports, and means whereby the movement of said supports in one direction will rotate the totalizer wheels carried thereby; substantially as described.

34. In a calculating machine, the combination of independently movable supports, devices for controlling the differential movement of said supports, totalizer wheels carried by said supports, and means whereby the movement of said supports will rotate the differential wheels carried thereby proportionate to the movement of said supports; substantially as described.

35. In a calculating machine, the combination of independently movable supports, devices for controlling the differential movement of said supports, independently rotatable totalizer wheels carried by said supports, and normally stationary racks for engaging said totalizer wheels to cause their rotation when their supports are moving in one direction; substantially as described.

36. In a calculating machine, the combination of independently movable supports, devices for controlling the differential movement of said supports, independently rotatable totalizer wheels carried by said supports, normally stationary racks for engaging said totalizer wheels to cause their rotation when their supports are moving in one direction, and carrying devices coöperating with said racks; substantially as described.

37. In a calculating machine, the combination of independently movable supports, printing type carried thereby, totalizer wheels also mounted on said supports, means for controlling the differential movements of said supports and their carried type and totalizer wheels, racks for coöperating with said totalizer wheels, and means for throwing said racks into and out of engagement with said wheels; substantially as described.

38. In a calculating machine, the combination with totalizer wheels, of carrying mechanism therefor comprising racks, carrying plates for holding said racks retracted, movable supports for the totalizer wheels, and means on said supports operated by said wheels for actuating said plates to effect carrying; substantially as described.

39. In a calculating machine, the combination of totalizer wheels and their coöperating racks, carrying plates for holding said racks retracted, and means operated by said totalizer wheels for tripping said carrying plates to permit a one-tooth movement of the racks only while said racks are in engagement with the totalizer wheels; substantially as described.

40. In a calculating machine, the combination of totalizer wheels, actuating racks therefor, and a carrying mechanism coöperating with said wheels, said carrying mechanism including an equalizing lever; substantially as described.

41. In a calculating machine, the combination of totalizer wheels, actuating racks therefor, carrying plates coöperating with said wheels, and equalizing levers on said carrying plates; substantially as described.

42. In a calculating machine, totalizer wheels, actuating racks therefor, carrying plates coöperating with said wheels, equalizing devices on said carrying plates, and tripping pawls actuated by said totalizer wheels, said tripping pawls coöperating with said carrying plates and equalizing devices; substantially as described.

43. In a calculating machine, the combination of movable totalizer wheel supports, means for controlling the differential movements thereof, totalizer wheels carried by said supports, displaceable racks with which said totalizer wheels coöperate, carrying plates for controlling the position of said racks, and means operated by the totalizer wheels for actuating said carrying plates; substantially as described.

44. In a calculating machine, the combination of totalizer wheel supports, means for controlling the differential movements of said supports, totalizer wheels carried by said supports, tripping projections on said totalizer wheels, tripping pawls actuated by said wheels, racks for coöperating with the totalizer wheels, and carrying plates operable by said tripping pawls in the different positions of the totalizer wheels with respect to said racks so as to effect carrying; substantially as described.

45. In a calculating machine, independently movable supports, means for controlling the differential movements of said supports, totalizer wheels carried by said supports, racks coöperating with said totalizer wheels, carrying devices coöperating with said racks whereby said totalizer wheels stand fully carried at the end of each operation of introducing an item thereinto, and means whereby the total may be obtained in said totalizer wheels during the time said racks remain in engagement therewith and after the introduction of the last item; substantially as described.

46. In a calculating machine, the combination with totalizer wheels and racks which are normally in engagement with each other, means for throwing them out of engagement, means for successively introducing items into the wheels, carrying mechanism whereby said wheels stand fully carried, means for obtaining a correct total from said totalizer wheels without disturbing the engagement between the racks and said totalizer wheels after the introduction of the last item into said totalizer wheels; substantially as described.

47. In a calculating machine, the combination of totalizer wheels, racks, and carrying mechanism, and means for operating the same to successively introduce items therein, whereby said totalizer wheels stand fully carried and in engagement with the racks after the introduction of the last item into said totalizer wheels, means for disengaging said racks and wheels and means for obtaining a total from said totalizer wheels while they are still in engagement with said racks; substantially as described.

48. In a calculating machine, the combination with independently movable totalizer wheel supports, totalizer wheels carried thereby, a swinging frame, and racks mounted in said frame for coöperating with said totalizer wheels; substantially as described.

49. In a calculating machine, the combination of movable supports, totalizer wheels carried by said supports, a swinging frame containing racks for coöperating with said totalizer wheels, and key-positioned stops mounted within said swinging frame; substantially as described.

50. In a calculating machine, the combination of a traveling carriage, vertically arranged series of stops arranged in said carriage, key-operated push fingers for positioning said stops and type carriers controlled by said stops; substantially as described.

51. In a calculating machine, the combination with digit keys, of a vertical series of push fingers operable thereby, a traveling carriage, a vertical series of stops which are designed to be successively brought under control of said push fingers, an escapement mechanism for controlling the step-by-step movement of the carriage to the left and type carriers controlled by said stops; substantially as described.

52. In a calculating machine, the combination of totalizer wheel supports, totalizer wheels carried thereby, means for moving said supports and their carried wheels for registering items therein and obtaining the total of said items, racks with which said totalizer wheels coöperate, and means for preventing unnecessary movement of said supports in the total-taking operations; substantially as described.

53. In a calculating machine, the combination of movable totalizer wheel supports, totalizer wheels carried thereby, racks with which said wheels coöperate, lifting arms for said supports, and pivoted racks coöperating with said lifting arms to prevent unnecessary movement of said supports during the total-taking operations; substantially as described.

54. In a calculating machine, the combination with a traveling carriage, stops arranged in said carriage, totalizer wheel supports having shoulder projections coöperating with the stops in said carriage, and a pivoted plate on said carriage for releasing said supports as they are successively brought under control of said stops; substantially as described.

55. In a calculating machine, the combination of bars having shouldered stops, a traveling carriage, stops in said carriage, a spring-pressed plate mounted on said carriage and normally preventing movement of said bars but permitting movement thereof as said bars are successively brought under control of said stops, and means for moving said plate so as to release all of said bars while the carriage is stationary; substantially as described.

56. In a calculating machine, the combination with a stop carriage and its stops, type carriers whose position is controlled by said stops, a hinged plate on said carriage for coöperating with the shoulder stops on said type carriers, and means for moving said plate out of the paths of said shoulder stops; substantially as described.

57. In a calculating machine, the combination with a stop carriage and its stops, type carriers whose position is controlled by said stops, a hinged plate on said carriage for coöperating with the shoulder stops on said type carriers, and a total key for moving said plate out of the paths of said shoulder stops; substantially as described.

58. In a calculating machine, the combination with totalizer wheel supports, totalizer wheels carried thereby, racks with which said totalizer wheels coöperate, a traveling carriage containing stops for controlling the differential movements of said totalizer wheel supports, a hinged plate on said carriage which releases said supports as they are brought successively under control of said stops, and a total key for operating said plate to simultaneously release all of said supports; substantially as described.

59. In a calculating machine, the combination of totalizer wheels and racks which are normally in mesh, digit keys, and means operated by said digit keys for effecting the disengagement of said wheels and racks; substantially as described.

60. In a calculating machine, the combination of totalizer wheels and racks normally in engagement, digit keys, and means operated by said digit keys whereby said racks are disengaged from said wheels upon the operation of the first digit key depressed in setting up a number to be introduced into the machine; substantially as described.

61. In a calculating machine, the combination of totalizer wheels and their racks which are normally in engagement, means for successively introducing items into said wheels of a total key for maintaining said engagement after the introduction of the last item, a power shaft, and means operated by the power shaft for disengaging the racks from the total wheels, whereby the totalizer wheels are permitted to return to their home position while standing at zero; substantially as described.

62. In a calculating machine, the combination with totalizer wheels and their racks, which parts are normally engaged, movable supports for said totalizer wheels, a total key for maintaining engagement between said wheels and racks during the initial part of the total-taking operation, a power shaft, means operated by the power shaft for effecting the disengagement of said wheels and said racks, when said wheels stand at zero, and means operated by said total key when held depressed to prevent said power shaft from effecting such disengagement, whereby the engagement between the wheels and racks continues and the total is retained in the totalizer wheels; substantially as described.

63. In a calculating machine, the combination of a traveling stop carriage, an error key, means operated by said error key for restoring said stop carriage and stops to normal position; substantially as described.

64. In a calculating machine, the combination with a power shaft, means for cushioning the stroke of the power shaft, and a paper-feeding mechanism operated by said cushioning means; substantially as described.

65. In a calculating machine, the combination of a power shaft, a dash pot for cushioning the stroke of the power shaft, and paper-feeding mechanism operated thereby; substantially as described.

66. In a calculating machine, the combination with a laterally adjustable paper carriage, one of whose frame bars is provided with a series of notches or recesses, a spring-pressed lock for entering said notches or recesses to lock said carriage in laterally adjusted positions, and a lever coöperating with said locking device to release the carriage; substantially as described.

67. In a calculating machine, the combination with a totalizer and its actuating devices, of a movable carriage containing stops for controlling said actuating devices, digit keys for positioning said stops, a total key, and means whereby when said total key has been operated said carriage is locked against movement; substantially as described.

68. In a calculating machine, the combination with a totalizer and its actuating devices, of a movable carriage containing stops for controlling the position of said actuating devices, digit keys for positioning said stops, a total key, and means for preventing the operation of said total key when said carriage is in other than its home position; substantially as described.

69. In a calculating machine, the combination of a total key and digit keys, and means whereby when any digit key is operated the total key cannot be operated; substantially as described.

70. In a calculating machine, the combination with a total key and digit keys, of a movable element which is moved in one direction upon the operation of any digit key and in another direction upon the operation of said total key, and means for preventing said element being moved by the total key when any digit key has been operated to position said movable element; substantially as described.

71. In a calculating machine, the combination with a total key and digit keys, of a movable element which is moved in one direction upon the operation of any digit key and in another direction upon the operation of said total key, and means for preventing movement of said element by any digit key when the total key has been operated; substantially as described.

72. In a calculating machine, the combination with a total key and digit keys, of a movable element which is moved in one direction upon the operation of any digit key and in another direction upon the operation of said total key, and means for preventing the movement of said element by either the total key or any digit key when the other key has been operated; substantially as described.

73. In a calculating machine, the combination, with a totalizer and its actuating devices, of stops, digit keys for positioning said stops, a traveling carriage in which said stops are mounted, a total key, and means common to all of the digit keys and said total key whereby when the total key is operated the digit keys cannot be operated and vice versa; substantially as described.

74. In a calculating machine, the combination of type carriers, an adding wheel mounted on each type carrier, and a tripping pawl mounted on each type carrier and coöperating with its adding wheel.

75. In a calculating machine, the combination of a type carrier, an adding wheel mounted thereon, a tripping projection on said adding wheel, and a tripping pawl mounted on said type carrier and coöperating with said tripping projection.

76. In a calculating machine, the combination of a type carrier, an adding wheel mounted thereon, and a detent for coöperating with said adding wheel to prevent accidental rotation thereof.

77. In a calculating machine, the combination of a series of denominational type carriers, an adding wheel mounted on each type carrier, means for differentially controlling movement of said type carriers and their respective adding wheels.

78. In a calculating machine, the combination of denominational type carriers, each of which carries an adding wheel, means for differentially positioning said type carriers and said adding wheels, a carrying mechanism, part of which carrying mechanism is mounted on said type carriers.

79. In a calculating machine, the combination of type denominational carriers, adding wheels on each of said type carriers, means for differentially positioning said type carriers and their associated adding wheels, displaceable racks with which said adding wheels coöperate, and means for effecting the displacement of said racks to effect carrying to wheels of higher order.

In testimony whereof I hereunto affix my signature in the presence of two witnesses, this thirteenth day of June 1908.

WILLIAM W. HOPKINS.

Witnesses:
F. R. CORNWALL,
GEORGE BAKEWELL.

Copies of this patent may be obtained for five cents each, by addressing the "Commissioner of Patents, Washington, D. C."